US006499365B1

(12) United States Patent
Baumgartner

(10) Patent No.: US 6,499,365 B1
(45) Date of Patent: Dec. 31, 2002

(54) ELECTRONIC METERING DEVICE

(75) Inventor: Matthias Baumgartner, Hamburg (DE)

(73) Assignee: Eppendorf AG, Hamburg (DE)

( * ) Notice: Subject to any disclaimer, the term of this patent is extended or adjusted under 35 U.S.C. 154(b) by 0 days.

(21) Appl. No.: 09/431,456

(22) Filed: Nov. 1, 1999

(30) Foreign Application Priority Data

Nov. 2, 1998 (DE) ........................................ 198 50 417

(51) Int. Cl.[7] .......................... B67D 5/08; G01F 13/00; B01L 3/02

(52) U.S. Cl. .................. 73/864.16; 73/861; 73/863.02; 73/864.11; 222/63

(58) Field of Search ......................... 222/63; 73/864.16, 73/864.11, 861, 863.01, 863.02, 863.03

(56) References Cited

U.S. PATENT DOCUMENTS 4,018,362 A * 4/1977 Ubaud ......................... 222/55
4,071,168 A * 1/1978 Stone ....................... 222/63 X
4,232,255 A * 11/1980 Carlen ...................... 222/63 X
4,392,587 A * 7/1983 Bourne ........................ 222/63
4,475,666 A * 10/1984 Bilbrey et al. ....... 73/864.16 X
4,616,305 A * 10/1986 Damiano et al. ........... 363/132
4,964,533 A * 10/1990 Allington et al. .... 73/864.18 X
5,130,096 A * 7/1992 Meili ..................... 422/100 X
5,269,353 A * 12/1993 Nonaji et al. ................. 141/59
5,320,499 A * 6/1994 Hamey et al. .............. 417/218
5,840,346 A * 11/1998 Hannaford ................ 222/63 X
6,161,723 A * 12/2000 Cline et al. ............... 222/63 X
6,254,832 B1 * 7/2001 Rainin et al. ........ 73/864.16 X

FOREIGN PATENT DOCUMENTS

JP 3-188326 * 8/1991 ........... G01F/13/00

* cited by examiner

*Primary Examiner*—Thomas P. Noland
(74) *Attorney, Agent, or Firm*—Sidley Austin Brown & Wood, LLP

(57) ABSTRACT

An electronic metering device with a drive comprising an electric drive motor, at least one displacement device comprising a piston fixed to an axle drivable by the drive, for metering the fluid, and an electronic control for the drive motor, with a transducer which converts a feed voltage delivered by an electrical voltage source into a supply voltage for the drive, the supply voltage being matched in size to the respective load of the drive.

15 Claims, 4 Drawing Sheets

ELECTRONIC METERING DEVICE

BACKGROUND OF THE INVENTION

The invention relates to an electronic metering device.

Electronic metering devices are applied in the laboratory for metering fluids. They are known in various embodiments. Metering devices functioning according to the air cushion principle have an integrated piston-cylinder unit, by way of which an air column is displaceable in order to suction sample fluid into a metering syringe and to expel this from the syringe. With this the piston-cylinder unit does not come into contact with the fluid. Only the metering syringe which as a rule consists of plastic is contaminated and may be exchanged after use.

With direct displacement metering devices on the other hand a syringe is directly filled with sample fluid. The piston and the cylinder of the syringe are thus contaminated by the fluid so that the syringe before the exchange of the fluid mostly must be replaced by a new syringe or be cleaned. Also this syringe consists as a rule of plastic.

Pistonless metering devices may comprise a metering tip with a balloon-like end section which is expanded for suctioning fluid, and for expulsion is compressed. Such metering tips are also already conceived as an exchange part.

Micro-metering devices may have a micro-membrane pump and/or a free jet meterer, wherein at least one of these components is designed with micro-system technology, in particularly with silicon, glass and plastic injection molding technology and/or plastic imprinting technology. The metering is achieved by deformation of a wall of a container which is filled with fluid. The electrical drive for the deformation of the wall may be piezoelectric, thermoelectric, electromagnetic, electrostatic, electromechanical, magnetorestrictive, etc.

Air cushion, direct displacement, pistonless and micro-metering devices may have an unchangeable or changeable metering volume. A changing of the metering volume is achieved by adjustment of the displacement of the displacement means, i.e. of the displacement path of the piston or of the degree of deformation of the balloon-like end section or of the chamber wall.

Dispensers are metering devices which may repetitively dispense an accommodated fluid in small part quantities.

Furthermore there are multi-channel metering devices which have several “channels” by way of which it is simultaneously metered.

All metering devices may in particular be designed as a hand apparatus and/or stationary apparatus.

All previously mentioned metering devices may be electronic metering devices in the meaning of this application. With this they comprise a drive means with an electrical drive for driving a displacement means with which it may be the case of the piston-cylinder unit or the balloon-like end section of a metering tip, or a chamber with a deformable wall. The electrical drive in particular may be an electrical drive motor, electric linear drive or an electrical drive mentioned in the context of the micro-metering devices. Furthermore an electronic control means for the drive and an electrical voltage source for the supply of the control means and the drive is present. Electronic metering devices have in particular the advantage of the high reproducibility of meterings. In particular by way of preset constant metering speed ($\mu$l/s) more exact results may be achieved than with manually driven metering devices. Furthermore they have the advantage of a broad area of application since they may fulfill simple pipetting functions as well as dispensing functions. The electrical voltage source may comprise a battery, an accumulator and/or mains electricity part.

With conventional electronic metering devices the electrical voltage source is dimensioned such that in the normal condition it makes available a sufficient power for the drive with all operating loads of the drive means. With a battery or an accumulator this requires a suitable number of cells. However with an advanced discharging and thus reducing feed voltage increasingly operating malfunctions occur. With a reducing feed voltage specifically the torque of the drive reduces so that the drive means no longer drives the displacement means with all occurring loads in the desired manner. In particular with the design of the drive as a stepper motor steps may be lost and by way of this metering errors arise. Therefore for a reliable operation over a desired time a complicated battery or accumulator supply with corresponding costs, volume and weight are required. The same applies to the embodiment of the electrical voltage source as a mains electricity part.

BRIEF SUMMMARY OF THE INVENTION

Proceeding from this it is the object of the invention to provide an electronic metering device with which the cost for the electrical voltage source, in particular its costs, space requirement and weight is reduced and the drive in spite of this at all operational loads is supplied with the required voltage.

This object is achieved by an electronic metering device with the features of claim 1. Advantageous formations of the electronic metering device are specified in the dependent claims.

The electronic metering device according to the invention has

- a drive means comprising an electric drive,
- at least one displacement means drivable by the drive means, for metering the fluid and
- an electronic control and/or regulating means for the drive with a transducer which converts a feed voltage delivered by an electrical voltage source into a supply voltage for the drive, this supply voltage being matched in size to the respective load of drive means.

According to the invention thus the control and/or regulating means makes available to the drive via a transducer a supply voltage which is matched to the respective load of the drive means. Thus for example at the beginning of the drive procedure it may increase the supply voltage in order to overcome start resistances of the displacement means. Thereafter it may reduce the supply voltage to a nominal value which is sufficient for the further drive of the displacement means set in motion. In the case that the metering device can be equipped with various displacement means which represent varying loads for the drive means, for example syringes of differing size, the supply may be matched to the respective displacement means. The control and/or displacement means controls the operation of the metering device, for example according to control commands which may be inputted via a keyboard so that it recognizes the respective operating condition of the metering device. According to predetermined criteria the control and/or regulating means may find a suitable supply voltage for each operating condition and make this available via the transducer. Furthermore information on the respective present displacement means, e.g. a coding of a syringe may be automatically read by the metering device or inputted separately. Furthermore the control and/or regulating means may evaluate the respective load which may be unforeseeably changed by external influences and on account of the evaluation result regulate the supply voltage. Thus the matching of the supply voltage to the respective load may be achieved.

The invention is not limited to the application of step-up transducers. Included is also the case in which the supply voltage required by the electrical drive lies below the feed voltage of the voltage supply. Thus for example Lithium Ion (Li-Ion) accumulators are available which deliver a relatively high voltage (approx. 3V per cell), so that by way of series connection of only a few cells a relatively high feed voltage may be made available. In the state of the art, in particular with the application of stepper motors, with a low load of the drive means the high feed voltage is partly converted into waste heat. This is undesirable for various reasons. Within the scope of the invention then in such cases a stepping-up convertion of the feed voltage to the supply voltage at the level required with the respective load may be effected. Also the invention includes the case in which the supply voltage from the transducer is increased as well as also reduced, according to the load of the drive means.

The metering device according to the invention has the advantage that the electrical voltage source and the drive may be matched to an average load. With increased loads the transducer makes available an increased supply voltage. Since these only occur for a short time no damage to the drive motor is to be feared. As a result of this the metering device makes do with a lower number of battery or accumulator cells or with a smaller-dimensioned mains electricity part than conventional metering devices. On the part of the electrical supply voltage a cost saving can be achieved which exceeds the additional costs of the transducer. Furthermore by way of this the space requirement for the voltage source is reduced and a weight reduction of the metering device is achieved. A further advantage lies in the fact that this is largely independent on the discharged state of a battery or accumulator.

The electrical drive may in particular be an electrical drive motor, an electrical linear drive or one of the electrical drives mentioned in the combination with micro-metering devices. An electrical drive motor may in particular be a stepper motor with which an impulse control favors exactly defined metering quantities or metering steps.

Additionally or instead of this, exactly defined metering quantities may also be ensured by end abutments, angle coders or coding strips.

Furthermore the drive means may have a gear for converting a rotational movement of a shaft of the drive motor into a linear drive movement for the displacement means. This may in particular be the case if the displacement means comprises a piston-cylinder arrangement. With this it may be the case of the syringe of a direct displacer or displacement unit of an air cushion metering device.

The electrical voltage source may comprise at least one battery, at least one accumulator and/or an electrical mains part. In particular NiMH accumulators may be present. Preferably by way of two such accumulators a feed voltage of 2.4 volts may be made available.

The transducer may deliver the supply voltage in particular roughly at the level of the feed voltage and above this. Thus the supply voltage at the level of a feed voltage of e.g. 2.4 Volts may be used in order to exert a holding moment onto a stepper moment which is designed for a nominal voltage of e.g. 6 Volts. Without such a holding moment with a stepper motor on braking there is a tendency to oscillate, so that it possibly covers one or more undesired steps.

Preferably the transducer may deliver the supply voltage at various discrete or continuous levels. Of these one may serve the production of the holding moment. A further level may be the nominal voltage which the drive motor requires with an average load. Furthermore it may also output an increased voltage level for increased loads. Accordingly the control and/or regulating means may deliver the supply voltage at a low level with the stopping of the drive motor, at the middle level with an average load and with an increased load at the increased level. For example the supply voltage may assume the discrete value 2.4 Volts, 6 Volts and 8 Volts.

Preferably the transducer comprises a step-up converter. Step-up converters in supply technology are known circuits with which a constant voltage may be brought to an increased level. Step-up converters may set an output voltage via the input voltage, wherein as a rule these exploit the energy stored in an inductance.

Preferably the electronic metering device is designed as a hand device and accordingly is equipped with at least one battery or at least one accumulator. The electronic metering device may in particular be an electronic pipetting device.

BRIEF DESCRIPTION OF THE DRAWINGS

The invention is hereinafter described in more detail by way of the accompanying drawings of embodiment examples. In the drawings there are shown.

DETAILED DESCRIPTION OF THE INVENTION

Figure 1:
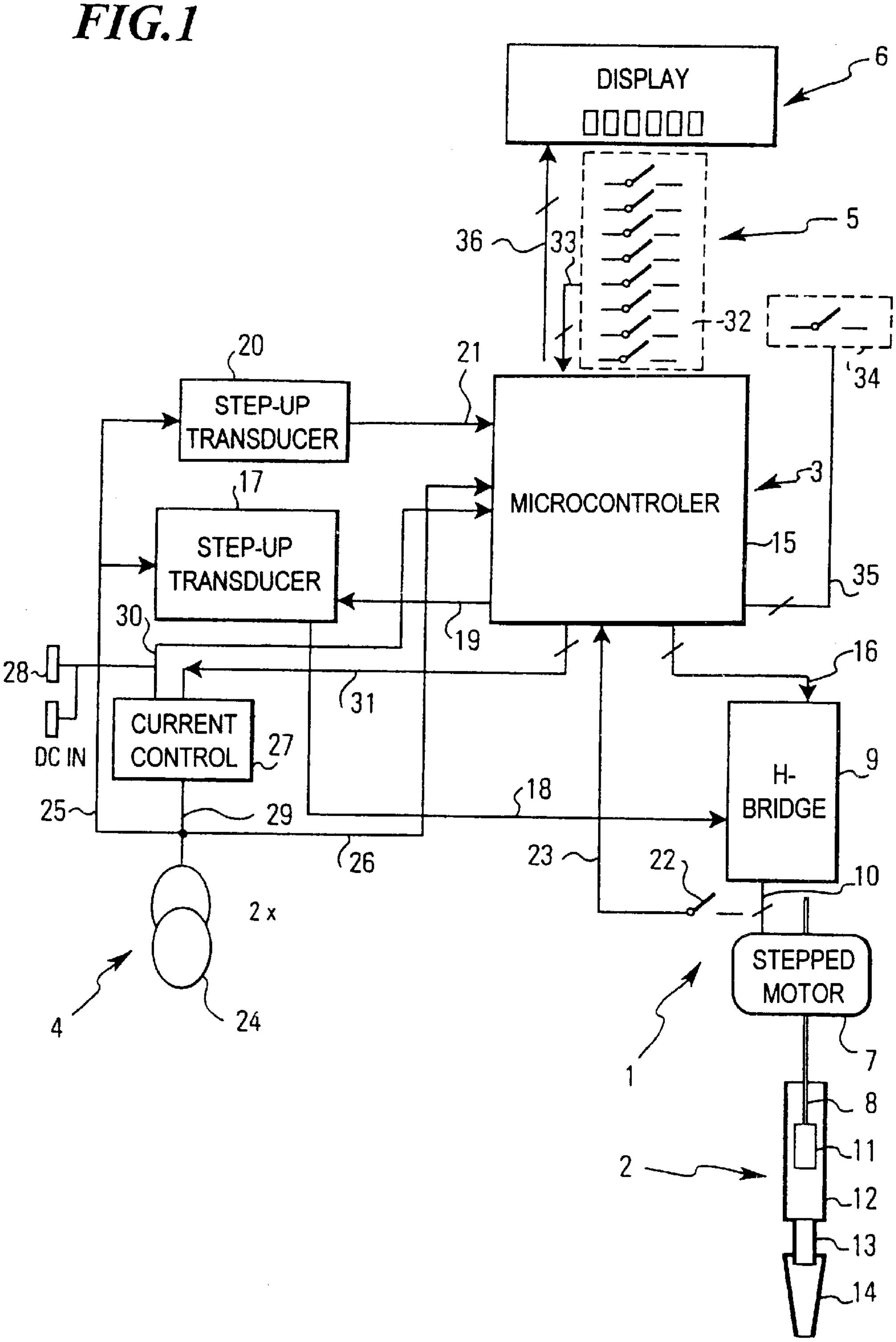
FIG. 1 a total block diagram of the electronic pipetting device.

According to FIG. 1 the electronic pipetting device consists essentially of six function regions, specifically a drive means 1, a displacement means 2, an electronic control and/or regulating means 3, an electrical voltage source 4, and operating means 5 and a display means 6. All function regions 1 to 6 are formed in or on a pipette housing—not shown—of a hand pipette.

"The drive means 1 comprises an electrical drive motor which is designed as a stepper motor 7. By way of the stepper motor 7 an axle 8 may be displaced linearly forwards and backwards. Furthermore to the drive means there belongs a motor step in the form of two H-bridges 9 which serve the control of the stepper motor 7. This in the manner known to the man skilled in the art comprises eight power transistors connected in an H-arrangement, with which the stepper motor 7 via supply leads 10 may be operated in the forwards or backwards direction. It is known to the skilled person that the H-bridge or H-drive is an arrangement for switches, i.e., relays or semiconductors for reversing the direction of current in any load."

The displacement means 2 comprises a piston 11 which is fixed on the axle 8. The piston 11 is displaceable in a cylinder 12. This is connected via a channel 13 to a pipette tip 14 which is separable from the device.

To the electronic control and/or regulating means 3 there belongs a micro-controller 15 which in particular has integrated a timer, an operating memory and a non-volatile memory. The micro-controller controls the H-bridges via control leads 16.

To this there further belongs a step-up transducer 17 for producing the supply voltage of the stepper motor 7 which via supply leads 18 feeds the H-bridges. Control leads 19 connect the micro-controller 15 to the step-up transducer 17.

A further component of the control and/or regulating means 3 is a further step-up transducer 20 which supplies the micro-controller 15 via further supply leads 21.

To the axle 8 of the stepper motor 7 there is allocated an end bearing switch 22 which via a control lead 23 is monitored by the micro-controller 15 in order to permit a zero-point setting.

The electrical voltage source 4 comprises two NiMH accumulators 24 whose feed voltage via feed leads 25 are supplied to the step-up transducer 17 and the further step-up transducer 20. The feed voltage of the two accumulators 24 are supplied via control leads 26 to the micro-controller 15. Furthermore to the electrical voltage source 24 there belongs a charging current control 27 which on the one hand via charging contacts 28 can be connected to an external voltage source and on the other hand via charging leads 29 is connected to the accumulators. The charging current control 27 is furthermore via control leads 30 for the charging voltage and via charging current leads 31 in each case connected to the micro-controller 15.

The operating means 5 comprises an input keyboard 32 which via leads 33 is connected to the micro-controller 15. Furthermore it comprises the trigger button 34 which via leads 35 is connected to the micro-controller 15.

The display means 6 is an LCD display which via leads 36 is connected to the micro-controller 15 which contains a display control.

Basically the pipetting device functions as follows:

The control software is stored in the micro-controller. Special pipetting parameters may be inputted before the metering procedure by way of an input keyboard 32. By way of the trigger buttons 34 individual pipetting procedures may be triggered. The display 6 displays inputted pipetting parameters, control commands and operating conditions of the pipetting device.

The complete feed voltage of the two accumulator cells 24 is 2.4 Volts. This is regulated by the further step-up transducer 20 to 3.3 Volts supply voltage for the micro-controller 15.

According to the control, via the control lead 19 the step-up transducer 17 connects through the feed voltage of the accumulators 24 as the supply voltage to the supply leads 18 or increases this to 6 or 8 Volts. Since the micro-controller controls the operation of the stepper motor 7 via the control leads 16, it knows the respective voltage requirement of the stepper motor and correspondingly controls the step-up transducer 17.

The feed voltage is controlled by the micro-controller 15 via the control leads 26. If it falls below an allowable voltage from the display 6 corresponding information is outputted. By way of connection of the charging contacts 28 to an external mains supply part in the case needed a charging of the accumulators 24 may be effected. Via the charging current control leads 31 the charging current is controlled according to the charged condition of the accumulators 24 evaluated via the control leads 30.

Figure 2:
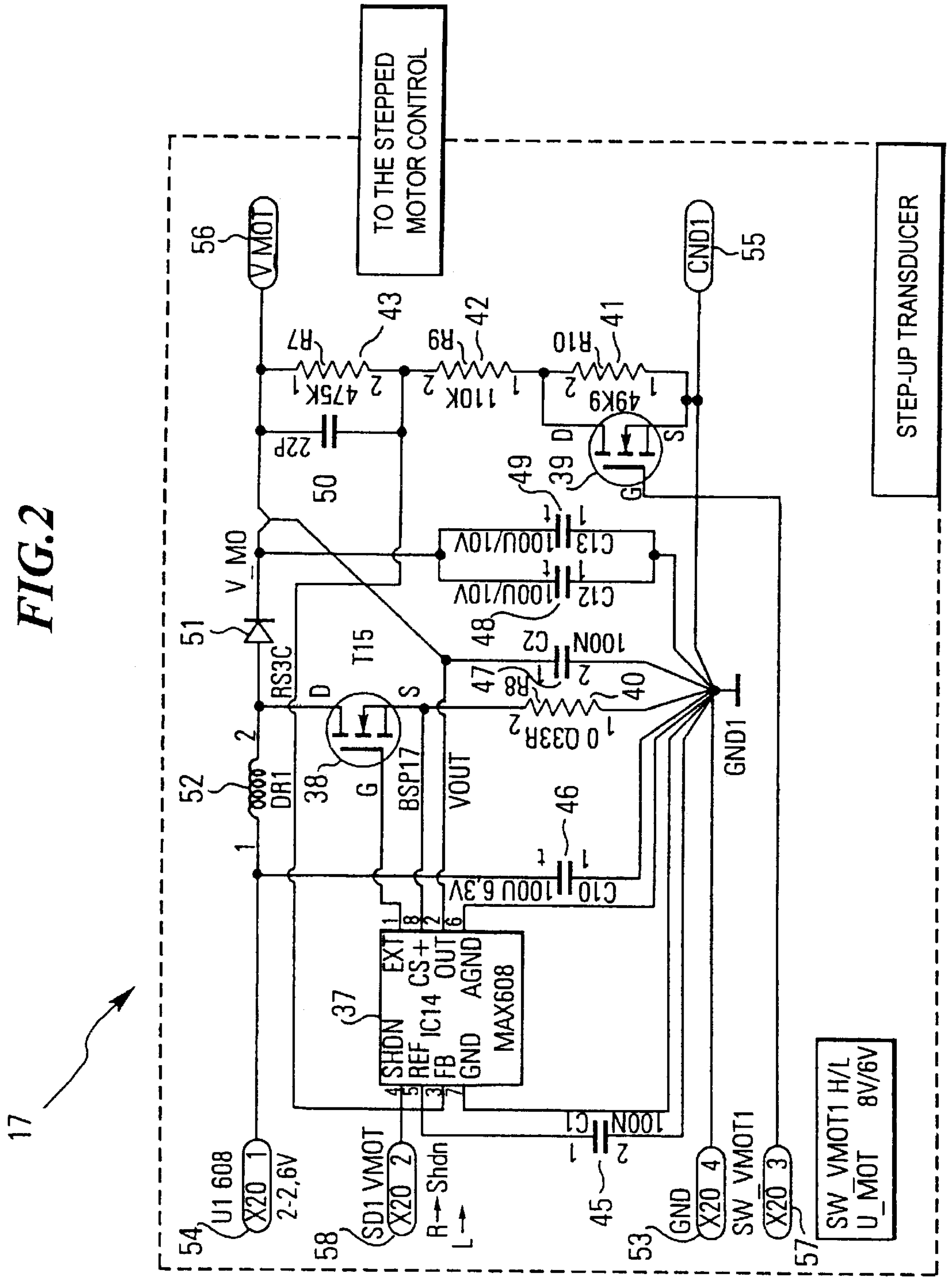
FIG. 2 a circuit diagram of the step-up converter of the same pipetting device.

The design of the function regions 1 to 6 and the associated function blocks is known to the man skilled in the art. One embodiment example of the step-up transducer 17 is however to be explained by way of FIG. 2. The step-up transducer 17 comprises an IC 37 of the type which amongst experts is known as "step-up converter". For example it is the case of an IC MAX 608 of the company Maxim. The IC 37 is in the usual manner connected to the transistor 38, resistance 40, capacitors 45 to 50, diode 51 and inductance 52. The IC 37 regulates via the voltage feedback consisting of transistor 39 and resistances 41 to 43, the switching time of the transistor 38, by which means the inductance 52 is charged with energy. This energy is outputted as an additional series voltage source during the blocking phase of the transistor 38 to the output capacitors 48 and 49. With this the voltage feedback can be switched by way of the contact 57. If the contact 57 is set to "low" the supply voltage is 6V, if it is on "high" it is 8V.

Finally by way of the contact 58 the supply voltage may roughly be set to the value of the feed voltage. For this the contact 58 is to be switched from "low" to "high".

Accordingly the feed leads 25 lie at the contacts 53, 54 and the supply leads 18 at the contacts 55, 56 and the control leads 19 are connected to the contacts 57, 58.

The drive motor 7 may thus by way of the electronic control means 3 be operated at three differing voltages:

a) the micro-controller 15 sets the contact 58 to "high" and the step-up converter 37 is not active so that the supply voltage corresponds to the feed voltage minus the loss voltage of the diode 51.

b) the micro-controller 15 sets the contact 57 of the step-up converter to "low" so that the transducer 39 is controlled and the IC 37 is activated and the step-up transducer 17 delivers a supply voltage of 6 Volts.

c) the micro-controller 15 sets the contact 57 to "high" so that the transistor 39 is blocked and the IC 37 is activated and the step-up transducer 17 makes available a supply voltage of 8 Volts.

With this for the step-up transducer there applies:

$$U_A \approx U_E \times (1 + t\mathbf{1}/t\mathbf{2})$$

wherein $U_A$ is the supply voltage and $U_E$ is the feed voltage. t1 is the time during which the transistor 38 is conducting and t2 is the time during which the transistor 38 is blocked.

If the transistor 38 conducts just as long as it blocks then there applies $U_A \approx 2 \times U_E$. If on the other hand the transistor blocks the whole time then there applies $U_A \approx U_E$.

The region in which voltages may be stepped up is limited by the resulting current and the applied components. The power balance remains approximately constant:

$$P_E = P_A$$

i.e.

$$U_E \times I_E = U_a \times I_a$$

wherein $P_E$ is the applied power and $P_A$ is the delivered power and $I_E$ is the applied current and $I_A$ is the supply current. Thus the applied current with the voltage step up increases considerably.

The increase of the torque of the drive motor 7 results from the fixed motor inner resistance and the increased driving voltage $U_A$. The electrical power which is converted in the motor is also a measure for the available motor torque.

By a motor with 2×30 Ohms winding resistance with a supply voltage of 3 Volts a maximum power of $$P = U^2/(1 - /2 \times R) = 0.6 \text{ Watts}$$

is converted. If on the other hand the voltage is stepped up to 8 Volts the power is increased to 4.3 Watts. The power increased roughly by the factor 7 may of course be converted by the motor only for very short times, since otherwise an overheating of the motor would take place. For overcoming the increased loads which usually with operation of pipetting devices occur only for a short time this is however possible without further ado.

Figure 3:
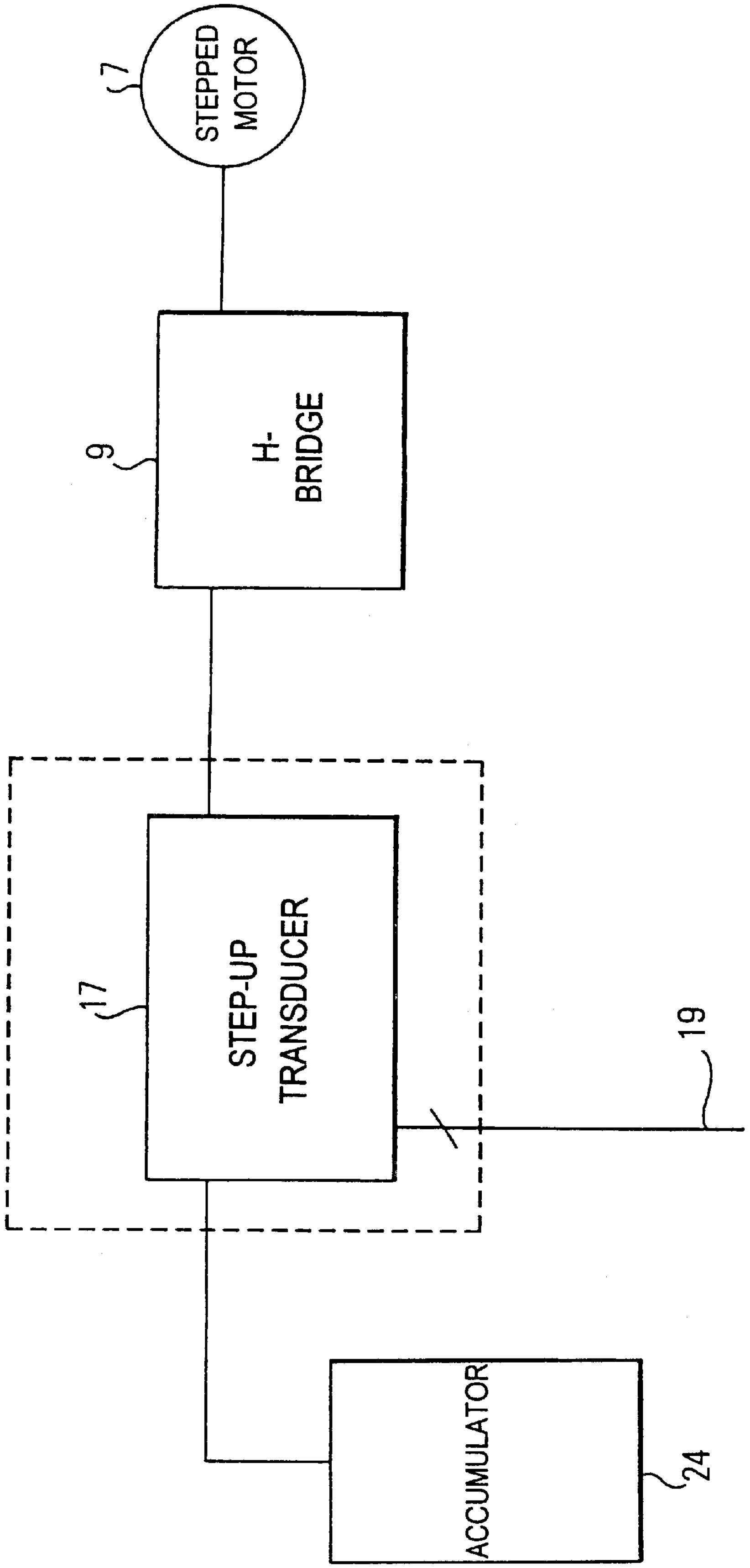
FIG. 3 a block diagram of the supply voltage of the drive motor of an electronic pipetting device.
Figure 4:
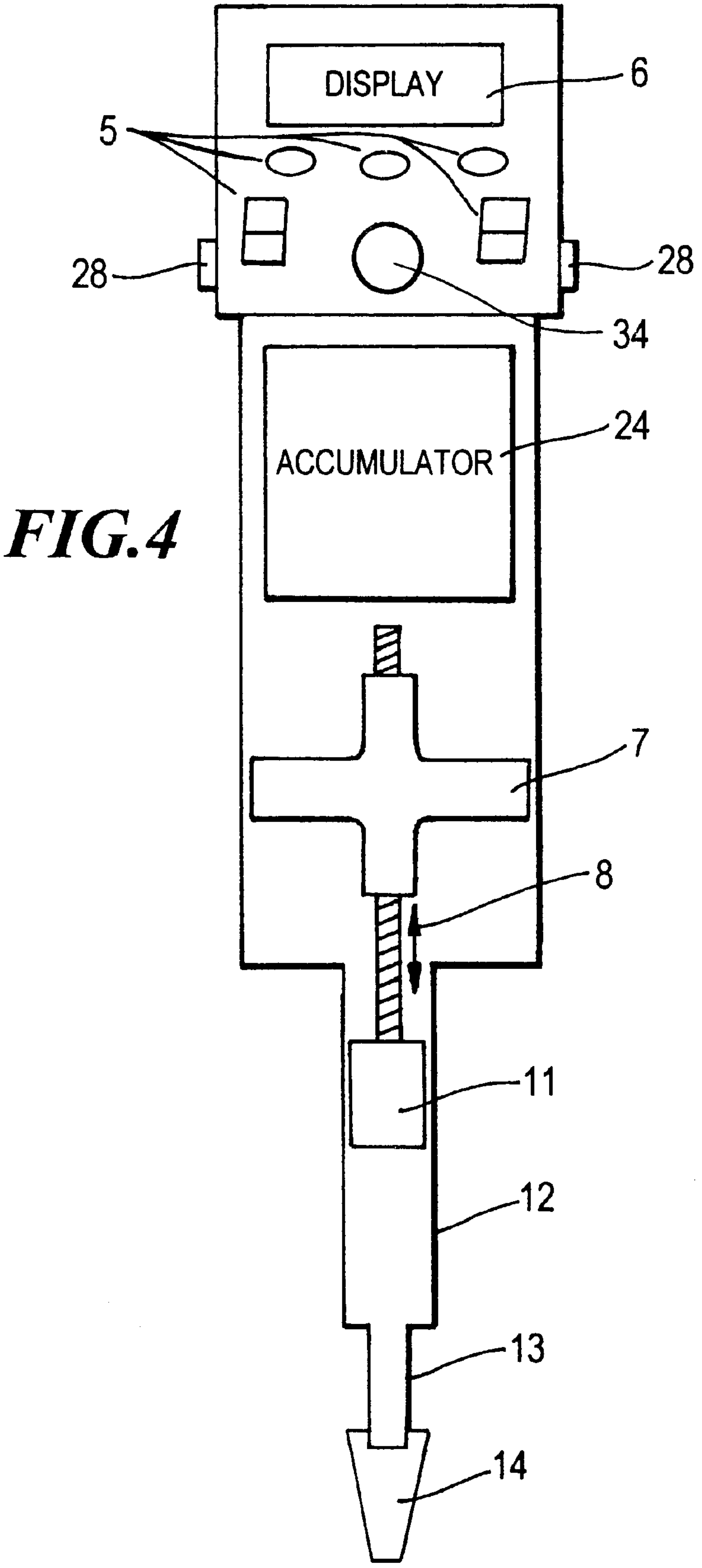
FIG. 4 a diagram of a hand pipetting device.

FIG. 3 emphasizes the function principle of the invention. An electrical voltage source 24 in the form of a battery, of an accumulator or of a mains supply part delivers a low feed voltage to an step-up transducer 17. This by way of control leads 19 via a voltage factor Nu is controlled digitally or analog and accordingly delivers a supply voltage according to the product of the voltage factor $N_u$ and the feed voltage. This supply voltage drives via the motor end step 9 the drive motor 7. Basically also a stepless variation of the voltage factor $N_u$ is possible, in order to achieve a fine adaptation to the power requirement.

What is claimed is:

1. An electronic metering device with a drive means (1) comprising an electric drive (7);

at least one displacement means (2) drivable by the drive means 1, for metering fluid and at least one of an electronic control and regulating means (3) for a driver motor (7), with a transducer (17) which converts a feed voltage delivered by an electrical voltage source (24) into a supply voltage for the drive motor (7), the supply voltage being matched in size to the respective load of drive means (1), wherein the transducer (7) delivers the supply voltage approximately at and over the level of the feed voltage.

2. An electronic metering device according to claim 1, wherein the electrical drive motor is a stepper motor.

3. An electronic metering device according to claim 1, wherein the drive means has a gear for converting a rotational movement on a shaft of the drive motor into a linear drive movement for the displacement means.

4. An electronic metering device according to claim 1, wherein the displacement means has a piston-cylinder arrangement which is formed as a syringe for receiving fluid to be pipetted or is connected via a channel to a pipette tip for receiving the fluid to be pipetted.

5. An electronic metering device according to claim 1, wherein the electrical voltage source comprises at least one battery and at least one of at least one accumulator and a mains electricity part.

6. An electronic metering device according to claim 5, wherein the electronic voltage supply (2) comprises NiMH (24) accumulators, NiCd accumulators or Li-Ion accumulators.

7. An electronic metering device according to claim 1, wherein the supply voltage is below the level of the feed voltage.

8. An electronic metering device according to claim 1, wherein the transducer delivers the supply voltage at various discrete voltage levels or variable voltage levels.

9. An electronic metering device according to claim 8, in which the transducer delivers the supply voltage at three differing levels.

10. An electronic metering device according to claim 8, in which the transducer delivers the supply voltage at least at the levels of 2.4 Volts, 6 Volts and 8 Volts.

11. An electronic metering device according to claim 8, wherein the control means on stopping the drive motor delivers the supply voltage at a low level, with a normal load of the drive means delivers the supply voltage at a middle level and with an increased load of the drive means delivers the supply voltage at a high level.

12. An electronic metering device according to claim 1, wherein the transducer comprises a step-up converter.

13. An electronic metering device according to claim 12, in which the transducer comprises an inductance.

14. An electronic metering device according to claim 1, wherein the control means controls the electrical drive motor via H-bridges.

15. An electronic metering device according to claim 1, wherein the device is formed as a hand pipetting device.

* * * * *